(12) United States Patent
Bruce

(10) Patent No.: US 8,308,290 B2
(45) Date of Patent: Nov. 13, 2012

(54) HOLDER FOR A SHEET OF MATERIAL

(76) Inventor: Michael Joseph Bruce, Ashingdon (GB)

( * ) Notice: Subject to any disclaimer, the term of this patent is extended or adjusted under 35 U.S.C. 154(b) by 407 days.

(21) Appl. No.: 12/612,071

(22) Filed: Nov. 4, 2009

(65) Prior Publication Data

US 2010/0110369 A1    May 6, 2010

(51) Int. Cl.
*G02C 1/00* (2006.01)
(52) U.S. Cl. .......................... 351/158; 351/63
(58) Field of Classification Search .............. 351/158, 351/41, 112, 51, 52, 62, 63; D16/101, 135, D16/165, 302
See application file for complete search history.

(56) References Cited

U.S. PATENT DOCUMENTS

| | | | | |
|---|---|---|---|---|
| 5,110,197 | A | * | 5/1992 | Arad ............................... 351/41 |
| 6,033,068 | A | * | 3/2000 | Spilkin et al. .................. 351/112 |
| 7,126,769 | B1 | | 10/2006 | Wu |

FOREIGN PATENT DOCUMENTS

| | | |
|---|---|---|
| GB | 1322346 A | 7/1973 |
| JP | 2007210314 A | 8/2007 |
| WO | WO00/43823 | 7/2000 |
| WO | WO2006/127202 | 11/2006 |

OTHER PUBLICATIONS

Search Report from GB0820191.5, dated Oct. 27, 2009; 2 pages.

* cited by examiner

*Primary Examiner* — Hung Dang
(74) *Attorney, Agent, or Firm* — Calfee, Halter & Griswold, LLP

(57) ABSTRACT

The present invention relates to a frame for holding a sheet of material. A frame arranged to removably locate a sheet of material in a vision area, the frame having binocular lenses focused away from the vision area. A benefit of the invention is that a user is provided with binocular lenses at the point of need. The user is thus saved from the embarrassment of having to admit to requiring reading glasses they had omitted to bring.

10 Claims, 6 Drawing Sheets

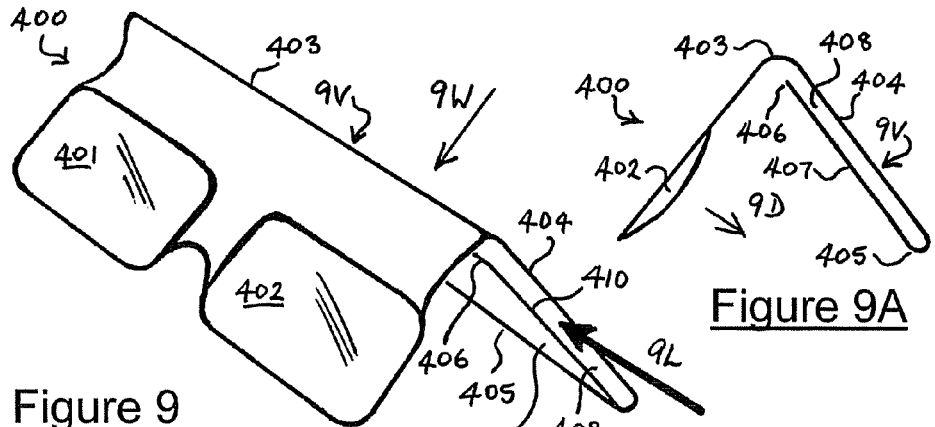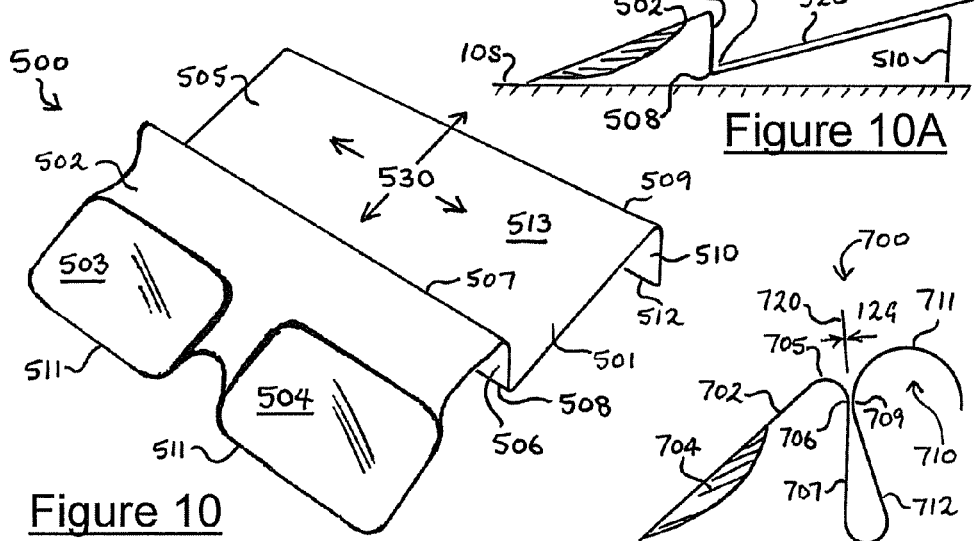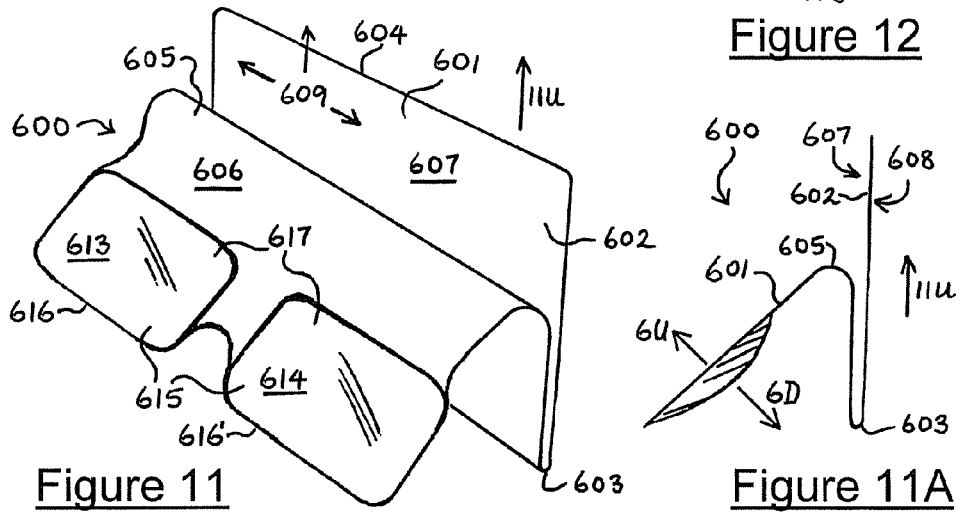

HOLDER FOR A SHEET OF MATERIAL

CROSS-REFERENCE TO RELATED APPLICATION

This application claims priority from UK Patent Application Serial No. GB 0820191.5, entitled IMPROVEMENTS IN AND RELATING TO A HOLDER FOR A SHEET OF MATERIAL and filed Nov. 5, 2008, the entire contents of which are incorporated herein by reference, to the extent that they are not conflicting with the present application.

BACKGROUND

Frames arranged to provide a location so as to hold one or more sheets of material are known, a particular example being a menu holder for placing on the table of a restaurant or the counter of a take-out diner. Another example is a holder for promotional material that is placed on a counter frequented by potential customers.

A problem exists for a significant proportion of the population, in that when going out of their house they only need to be able to see relatively distant objects, however, on arriving at, say, a restaurant, they are then presented with a menu to read which for many people is impossible without reading glasses. In the case of a restaurant menu, the problem is frequently compounded as the menu may be printed in relatively small type on a colored background, and often the level of illumination provided by the restaurant lighting is low.

SUMMARY OF THE INVENTION

In an illustrated embodiment of the invention, a frame for holding a sheet of material and at least one lens is disclosed.

According to a first aspect of the present invention, there is provided a frame for providing a vision aid to a user, the frame arranged to removeably locate a sheet of material in a vision area of the user, the frame having at least one lens directed away from the vision area and wherein the frame is formed from a blank. A benefit of the invention is that a user is provided with a lens at the point of need. The user is thus saved from the embarrassment of having to admit to requiring reading glasses they had omitted to bring.

Preferably the frame is provided with binocular lenses directed away from the vision area. A benefit of binocular lenses is that it is easier to read when using both eyes.

According to a second aspect of the present invention there is provided a vision aid to a user, the device including a frame bent to form a front facing portion, a rear facing portion, and at least two bottom facing surface contact points such that the frame is arranged to rest on a surface, and further arranged to form a holding portion for removably securing at least a sheet of material; and a pair of reading glasses secured to the frame on the front facing portion. A benefit of the frame including a pair of reading glasses is that a user is provided with two lenses arranged to give binocular vision when using the vision aid. A benefit of the frame resting standing up on a surface is that a user may easily pick the frame up from the surface.

Preferably the at least one lens is directed toward a center of the frame. A benefit of the lens being directed away from the vision area and toward a center of the frame is that the user can look through the lens without it being obstructed by the frame or a part of the frame.

Preferably the frame has a cross-sectional shape including at least an inverted V shape. A benefit of the inverted V shape is that an edge of the frame will rest on a surface with a surface of the lens portion is away from the surface. A further benefit of the inverted V shape, is that the lens portion is positioned facing outwardly and upwardly so that it is highly visible to a potential user, who will then be likely to pick it up to use it.

Preferably the inverted V shape extends to at least an end of the frame. A benefit of the inverted V shape extending to an end of the frame is that a user may easily grasp the frame without obstructing a view through either of the lenses.

Preferably the frame has a cross-sectional shape further including at least a U shape. A benefit of the U shape is that the frame may be easily arranged to removably hold a sheet of material. A further benefit of the U shape is that it is easier for a user to grasp than the sloping sides of the inverted V shape, and hence a user's fingers are kept away from the surfaces of the lenses.

In an embodiment of the invention preferably the frame has a cross-sectional shape including an M shape. A benefit of the frame including an M shape is that manufacture of the holder is simplified. A further benefit is that the holder is stable when stood on an uneven surface.

Preferably an inverted U shaped gap is provided between the lenses. A benefit of the inverted U shaped gap is that a central location is provided for a user to easily position the lenses either side of the user's nose so that each of the lenses is positioned in front of an eye.

Preferably the frame is arranged to rest on a surface, the sheet of material being located such that the vision area is above the surface and extends away from the surface. A benefit of the sheet of material being held above the surface and extending away from the surface is that it is highly visible to a user from a distance.

Preferably the frame is arranged to rest on a surface, the sheet of material being located such that the vision area is substantially perpendicular to the surface and extends away from the surface. A benefit of the sheet of material being held substantially perpendicular to the surface and extending away from the surface is that the sheet of material in the vision area is highly visible to a user from either side of the sheet of material.

In an embodiment of the invention, the sheet of material when located in the vision area, is supported at an acute angle to the vertical. A benefit of the sheet of material being supported at an acute angle in the vision area is that the sheet is held up from the surface so that it is highly visible to an approaching person. In a particular embodiment a suitable value for such an acute angle has been found to be no more than 75 degrees to the vertical.

Preferably the lenses are directed to a plane beyond a furthest extent of the frame. A benefit of the lenses being directed to a plane beyond a furthest extent of the frame is that a size of a sheet of material that may be viewed is not limited by the magnified viewing area, or the actual size of the frame itself, as the sheet of material may be moved around in the said plane so as to view the whole extent of the sheet.

Preferably the lenses are directed below the surface. A benefit of the lenses being directed below a surface on which the frame is resting, is that the lenses do not prevent the viewing by a person with good vision of the sheet of material when supported in the vision area by the frame.

According to a third aspect of the present invention there is provided a device for providing a vision aid to a user, the device including:

a frame having an M-shaped cross section, a front facing portion, a rear facing portion, a holding portion disposed between the front facing portion and the rear facing portion, and at least two outer edges such that the frame is arranged to rest standing on a surface; and a pair of reading glasses secured to the frame on the front facing portion;

wherein the holding portion extends in a direction of the surface and forms a slot for removably locating at least a sheet of material, and an outside surface of the holding portion is arranged as a gripping location such that a user can hold the pair of reading glasses up to the user's eyes.

BRIEF DESCRIPTION OF THE DRAWINGS

Further features and advantages of the invention will become apparent from the following detailed description made with reference to the accompanying drawings, wherein:

FIG. 8 is a perspective view of a frame according to a third embodiment of the invention;

FIG. 9 is a perspective view of a frame according to a fourth embodiment of the invention;

FIG. 9A is an end view of the fourth embodiment shown in FIG. 9;

FIG. 10 is a perspective view of a frame according to a fifth embodiment of the invention;

FIG. 10A is an end view of the fifth embodiment shown in FIG. 10;

FIG. 11 is a perspective view of a frame according to a sixth embodiment of the invention;

FIG. 11A is an end view of the sixth embodiment shown in FIG. 11;

FIG. 12 is an end view of a frame according to a seventh embodiment of the invention.

DETAILED DESCRIPTION

Figure 1:
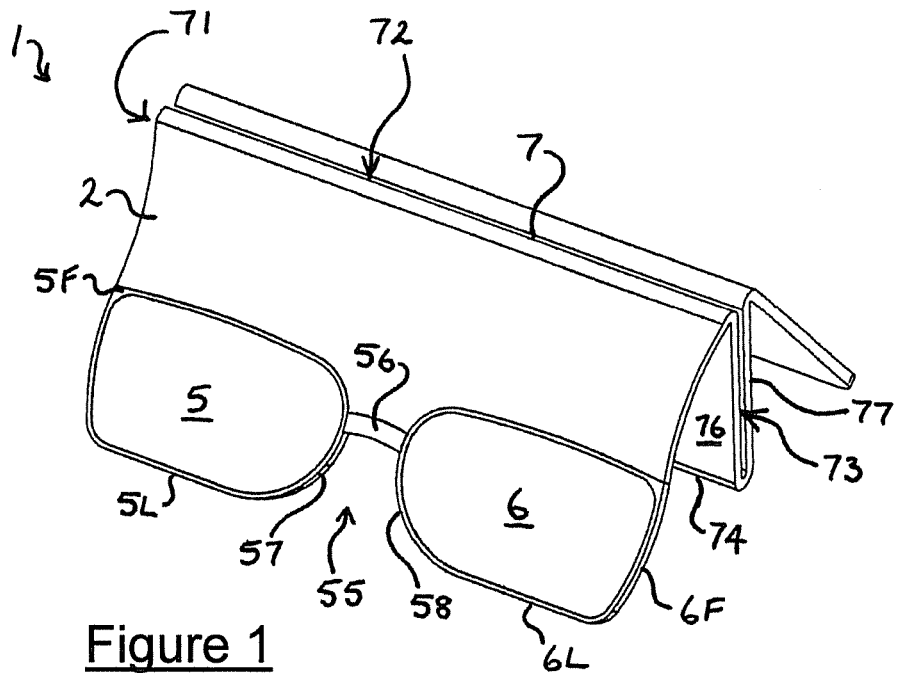
FIG. 1 is a perspective view of a frame according to a first embodiment of the present invention.

This Detailed Description of the Invention merely describes embodiments of the invention and is not intended to limit the scope of the claims in any way. Indeed, the invention as described is broader than and unlimited by the preferred embodiments, and the terms used have their full ordinary meaning.

The FIGS. 1 to 6 inclusive, show a first embodiment 1 of the invention including a frame 2 that is arranged to removably locate a sheet of material 3 in a vision area 4, the frame having a pair of binocular lenses 5, 6 each of the lenses focused away from the vision area. From FIG. 2 it can be seen that the vision area 4 is a planar surface extending away in the direction of arrows 1A, 1B and 1C from each of three open edges 71, 72 and 73 respectively of a holding portion 7. The holding portion 7 has a closed side 74 forming a base to the holding portion. In the first embodiment the holding portion 7 is a channel 75. The holding portion is arranged to locate or hold the sheet of material in the vision area 4.

Holding portion 7 lies substantially at a center of the frame 2. Each of the lenses 5, 6 is directed in a direction towards the center of the frame, to a plane of the magnified field of view 6V which is beyond a furthest extent of the frame at side 74 and bottom facing surface contact point, being edge 79.

The binocular lenses are separated by a substantially inverted U shaped gap 55, which is bounded at a top concave curved edge by bridge 56, and at the sides by convex curved surfaces 57 and 58. The bridge 56 and side surfaces 57 and 58 form a bridge and nose pads to assist a user 60 to position the lenses in a convenient plane 6P resting on the bridge 62 of their nose 63 in front of their eyes 61. The bridge 56 and the curved surfaces 57 and 58 are preferably formed with large radii along their edges 12, 13 and 14 respectively. Hence, the lenses are arranged as a pair of reading glasses 59 which are comfortable for a user to hold against their nose.

Figure 6:
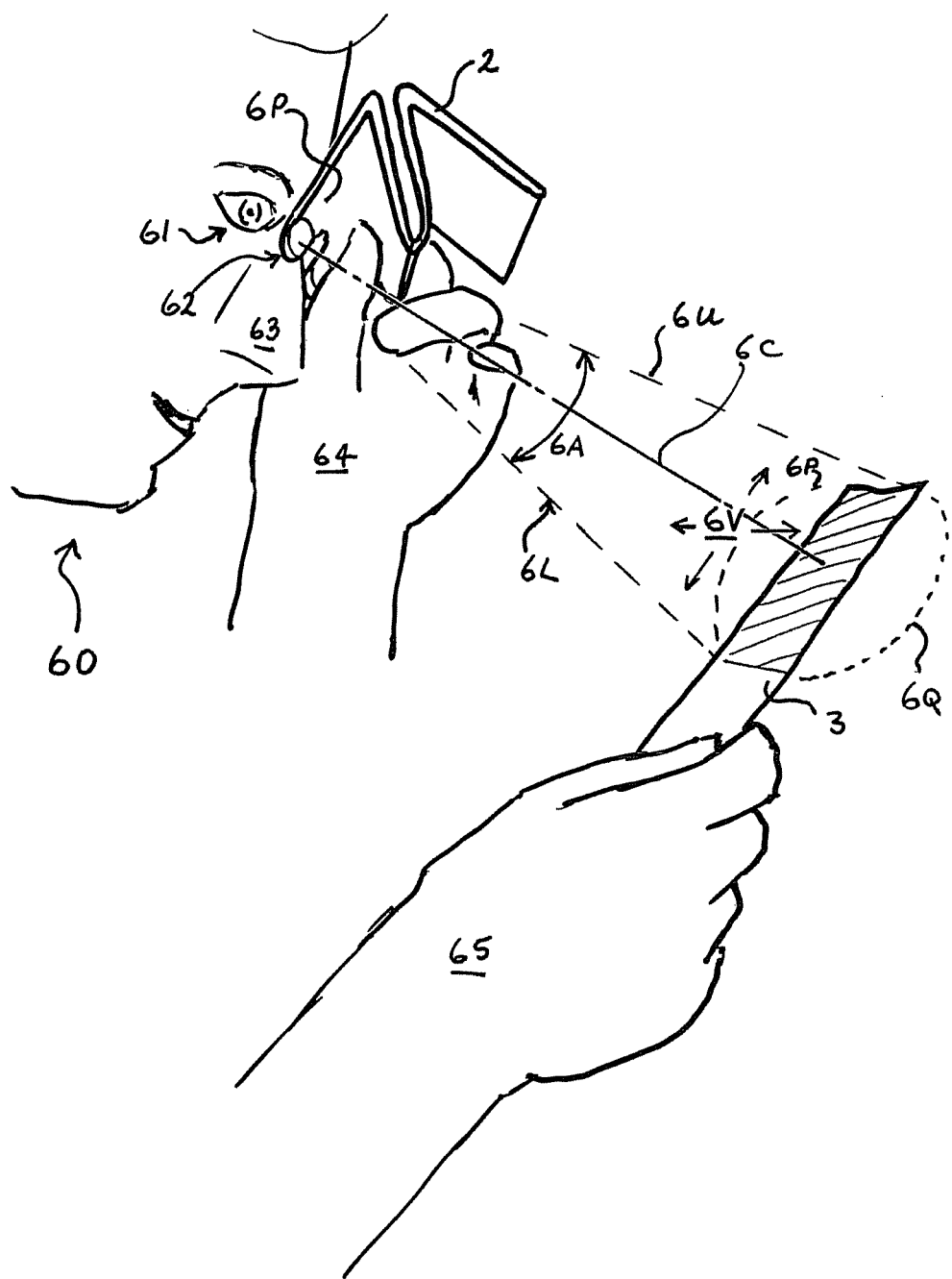
FIG. 6 is a diagrammatic end view of the frame shown in FIG. 1 being used by a user.

When a frame 2 is held in a hand 64 as shown in FIG. 6 by a user in front of their eyes 61, the user is provided with a magnified field of view 6V bounded by an upper limit 6U and a lower limit 6L. The magnified field of view is also bounded by sideways limits 6P and 6Q. The limits, by reason of the optical properties of the lenses, are curved, and form a continuous bound to the magnified field of view 6V. A size of the magnified field of view expressed in terms of the angle 6A will vary according to how the user holds the frame 2. The focus of the binocular lenses is directed away from the vision area 4.

For a particular user, the boundaries of a magnified field of view as seen from one eye may differ slightly from the boundaries as seen from the other eye, and hence only a common portion of the magnified field will be viewed by both eyes. Both lenses are directed towards the magnified field of view 6V. Hence a user with binocular vision is enabled to use both eyes to focus on a portion of the sheet of material 3 held in the magnified field of view 6V. A focal plane of the magnified field of view 6V is at a suitable distance from the users eyes so that it is convenient for the user to hold the sheet in the focal plane. The focal plane is remote from the frame, so that a large sheet may be moved around without being obstructed by the frame.

The focal plane preferably lies beyond a furthest extent of the frame as shown in FIG. 6. Hence, a sheet of material, such as a piece of paper or a card being held and viewed in the focal plane by a user can be freely moved in all directions relative to the frame by the user.

In use, the user 60 first removes the sheet of material from where it is held or located in the holding portion 7, and holds it in their hand 65. The user then grasps the frame 2 with the other hand, holding it so that the gap 55 may be positioned conveniently over their nose. The user may then adjust the relative positions of the frame and the sheet of material so that they are enabled to read small print on the sheet of material. If the lenses 5 and 6 are held close to the eyes, then the field of view 6V will be greater, but a degree of magnification of the sheet of material 3 will be lower. When the user has finished, then the frame 2 may be replaced on a supporting surface 3S, for example a table or reception desk counter, and the sheet of material replaced in the holding portion 7 ready for another user. A user with good close-up vision will be able to read the sheet of material without the assistance of the optical lenses 5 and 6, and hence does not need to remove the material from the frame where it is held in the vision area 4 so as to be readily seen.

Hence in an embodiment such as that shown in FIGS. 1 to 6 inclusive, there is provided a vision aid 1 to a user 60, the device including a frame 2 bent to foam a front facing portion, leg 8, a rear facing portion, leg 9, and at least two bottom facing surface contact points, one surface contact point being lower edges 5L, 6L and the other a corresponding bottom facing edge of leg 9, such that the frame is arranged to rest standing on a surface 3S, and further arranged to form a holding portion 4U for removably securing at least a sheet of material 4; and a of pair lenses 5 and 6 being reading glasses secured to the frame on the front facing portion that is wall 60.

When the frame 2 is at rest standing on the surface 3S, the lenses 5, 6 of the reading glasses are facing towards the surface. The lenses 5, 6 of the reading glasses are arranged at an acute angle to the vertical and in a side by side orientation. This orientation being that in which a user would hold the lens or lenses or reading glasses in use. Hence, when user 60 holds the frame 2 as shown in FIG. 6, the frame extends away from the user. The lenses 5, 6 are thus directed in a direction towards a center of the frame.

In the embodiment shown in FIG. 1, the material is preferably releasably held in the holding portion 7 by a resilience of the closed side 74 and the walls 76 and 77, which are urged together so as to hold a top edge of the walls together to maintain a minimum gap 78. From FIG. 3, it can be seen that the embodiment 1 includes a substantially M shaped cross section 3M, with the walls 76 and 77 forming the center portion of the M shape, and with external legs 8 and 9, angled at angles 3A and 3B respectively to the substantially vertical walls 76 and 77, forming the outer portions of the M shape.

Alternatively, the cross section 3M of embodiment 1 could be considered to comprise an inverted V shape 4V connected by a U shape 4U to a further inverted V shape 4X. From FIG. 4, it can be see that the inverted V shape 4V formed by lens wall 8 and the adjacent wall 76 continues as an open V to each end 4E and 4F. Likewise inverted V shape 4X continues as an open V to each end 4E and 4F. Hence as can be seen from FIG. 6, the user 60 is able to hold the frame 2 in hand 64 with the hand substantially to one side and above the magnified field of view. Hence the user's hand 64 does not obstruct the magnified field of view in use. While the FIG. 6 shows the frame held in the left hand, since the frame is symmetrical about a center line 4Q of the U shaped gap 55, corresponding to the user's nose, a user may equally well hold the frame in their right hand. The center line 4Q lies in a plane substantially perpendicular to a plane 4L of the lenses. A plane of the magnified field of view 6V is substantially parallel to the plane 4L and substantially perpendicular to a center line of sight 6C. It should be noted however, that in use a user may be still able to focus adequately on the whole of the magnified field of view 6V when the sheet of material is held such that it is not aligned parallel with the plane 4L or perpendicular to the center line of sight 6C. Although in FIG. 6, only one line 6C is shown between a users right eye and the plane of the magnified field of view, for a user with binocular vision there will be two center lines of sight, one from each eye, which will converge at the focal plane of the magnified field of view 6V.

From FIG. 1, it can be seen that the lenses 5 and 6 are arranged with a surrounding frame 5F and 6F respectively around each of the lenses. The visual appearance of the surrounding frame 5F and 6F and the bridge 56 assists in identifying the purpose of the lenses to a new user. The surrounding frame 5F and 6F is preferably molded as a portion of the frame 2, so that a risk of fracture or separation of the surrounding frame from the rest of the frame 2 is avoided. The lenses 5 and 6 may be molded within the surrounding frames 5F and 6F, with the molding of the frame itself if the lenses are made of the same material as the frame. Alternatively the lenses may be molded in a subsequent operation if it is preferred that they are made of a material with different optical properties to the frame. Lower edges 5L and 6L of the frames 5F and 6F respectively are arranged to rest on the supporting surface 3S. The lower edges 5L and 6L are at an extremity of an externally facing side of the inverted V shape 4V.

In the first embodiment, the closed side 74 is spaced a distance 3H from a plane of the support surface 3S. A benefit of this is that a limiting effect of the wall 76 on the magnified field of view 6V is reduced. From FIG. 3 it can be seen that the upper bound 6U is defined at least in part by the closed side 74, which forms an edge to the wall 76. Hence the field of view 6V extends below and away from the furthest extents of the frame. A further benefit is that the stability of the holder 1 when placed on an uneven surface is improved, as otherwise a rocking motion about the center would be occasioned if the closed side 74 abutted the surface. From FIG. 3, it can be seen that increasing the angle 3A the magnified field of view will be increased, by effectively moving the closed side 74 further out. In a menu holder made as embodiment it has been found that a suitable value for the angle 3A is 45 degrees.

In another embodiment, it has been found advantageous to have a larger angle 3A, of 60 degrees, as this allows the leg 8 to be significantly longer, and hence a printable surface 10 above the optical lenses is larger. The printable surfaces 10 and 11 may be used for promotional advertising, where the print and colors used are such that even a person with limited visual acuity would be able to recognize the brand being promoted.

In a further alternative embodiment, where it is desired to minimize the space taken by the frame when placed on a surface, the angle 3A has been reduced to a minimum value of 30 degrees.

In the first embodiment, the walls 76 and 77 smoothly blend with the legs 8 and 9, such that a top radius 8R and 9R of each wall and leg respectively is at the same relative height from the supporting surface.

In an alternative embodiment not shown herein, the walls and legs are of different lengths, and hence the top radii corresponding to top radii 8R and 9R are at different heights from the supporting surface.

Figure 7:
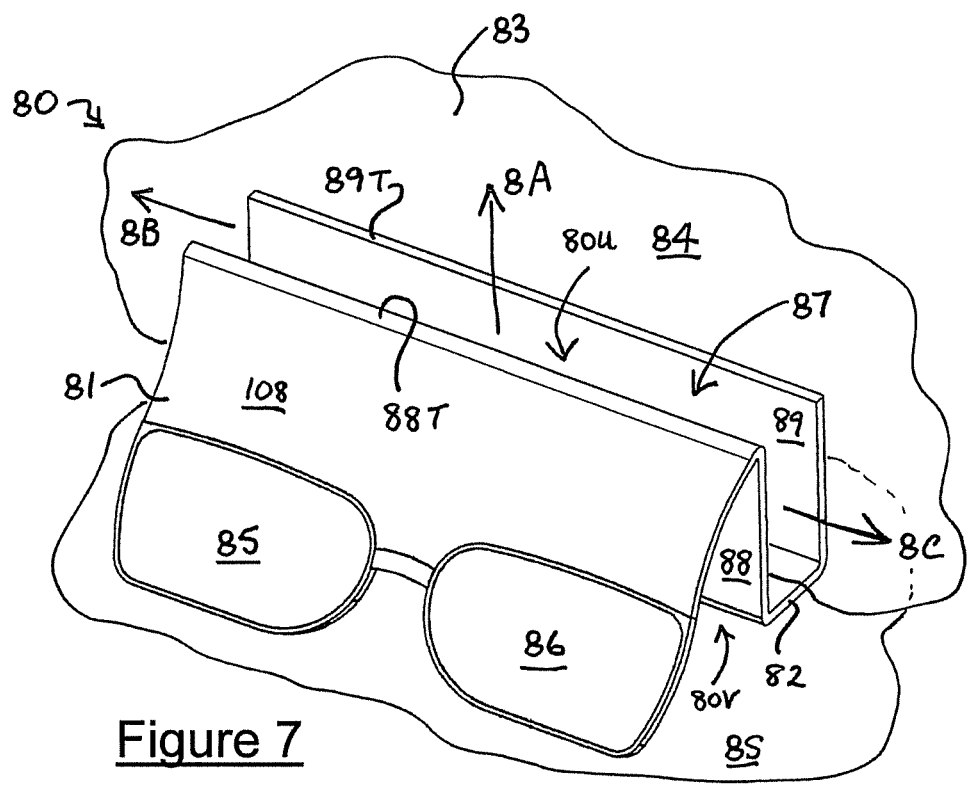
FIG. 7 is a perspective view of a frame according to a second embodiment of the present invention.
Figure 2:
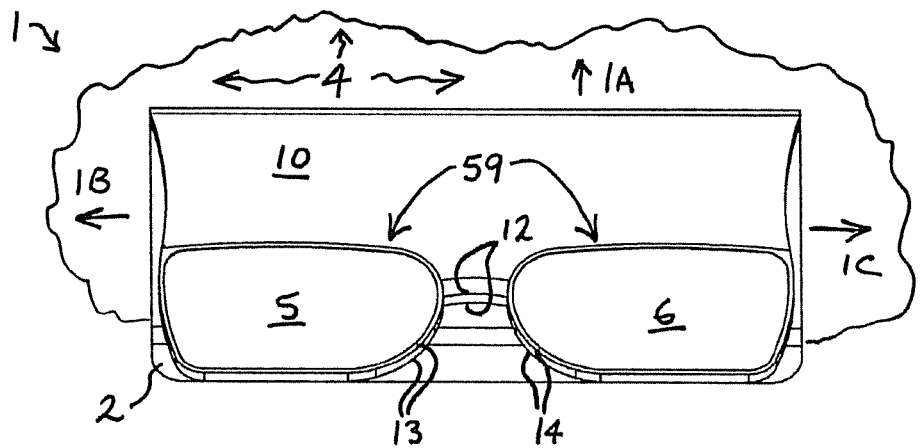
FIG. 2 is a front view of the frame shown in FIG. 1.
Figure 3:
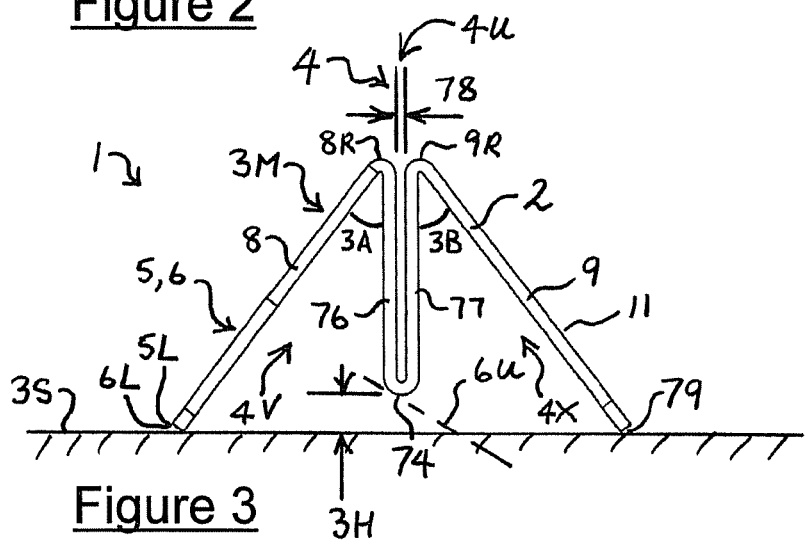
FIG. 3 is a cross-sectional view of the frame shown in FIG. 1 viewed from one end.
Figure 4:
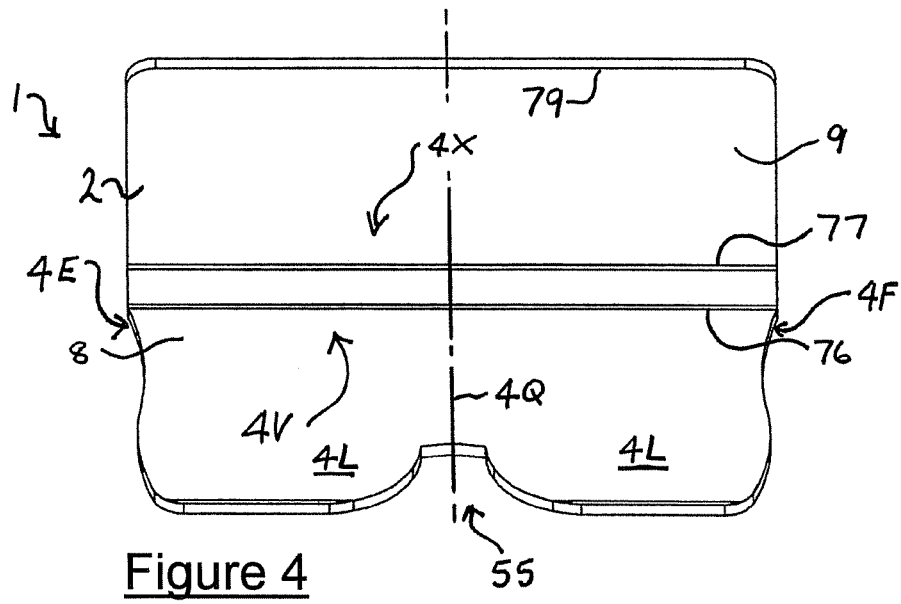
FIG. 4 is a view from below of the frame shown in FIG. 1.
Figure 5:
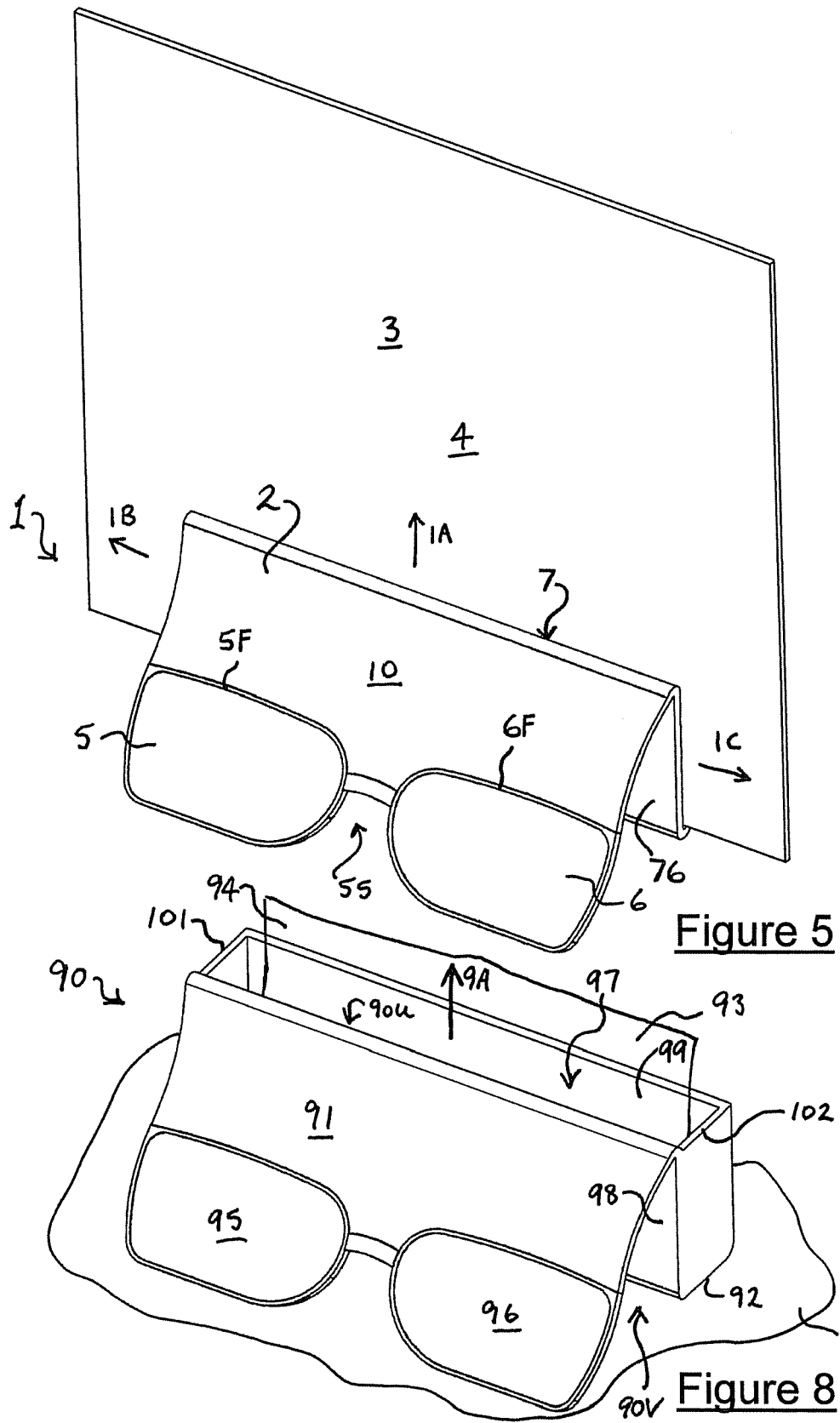
FIG. 5 is a perspective view of the frame shown in FIG. 1, with a sheet of material mounted to the frame.

FIG. 7 shows a second embodiment of the invention 80, having a frame 81 arranged to removably locate a sheet of material 83 (shown as being transparent in this figure) in a vision area 84. The frame 81 has binocular lenses 85 and 86 focused away from the vision area 84. The frame 81 of the second embodiment is provided with a wide slot 87, formed by closed base 82 and two opposed upstanding sidewalls 88 and 89. The base 82 is arranged to rest on a surface 8S. The vision area 84 extends upwardly in the direction of arrow 8A, and sideways in the direction of arrows 8B and 8C from the wide slot 87. The wide slot 87 is arranged to locate or hold a plurality of sheets of material. Such a plurality of sheets of material could comprise a folded leaflet, or a bound booklet.

The embodiment 80 is used in a similar manner to the first embodiment. A user will remove the sheet or sheets of material from the wide slot 97 and hold it in one hand, while picking up and holding the frame 81 in front of their eyes so as to enable the optical binocular lenses to be used to facilitate viewing of the sheet or sheets of material. The embodiment 80 includes a substantially inverted V shaped cross section 80V connected to a substantially U shaped section 80U. The inverted V shaped portion is formed by wall 108 and wall 88, and the substantially U shaped section is formed by wall 88 and closed base 82 and wall 89. The wall 108 has the two lenses 85 and 86 arranged for binocular usage. The frame 81 may be made of an injection molded plastics material, in which case the lenses 85 and 86 are preferably molded with the frame.

Alternatively, the frame 81 may be formed from a sheet of plastics material, in which case the lenses 85 and 86 may be mounted to the frame by being inserted into suitable apertures within the frame. In a further alternative arrangement, where the frame 81 is formed from a sheet of plastics material, the lenses may be mounted with a transparent adhesive to one side of the sheet of material.

The magnification strength of the lenses may be chosen so as to be most suitable for a majority of the anticipated users in a particular application. Typically, a magnification of between one to three diopters is likely to be useful to an average user. A diopter is well-known in the art as a unit of measurement of the refractive power of a lens which is equal to the reciprocal of the focal length measured in meters. Preferably, both lenses have the same magnification strength. A magnification much higher than three diopters is likely to cause users to hold the sheet of material being viewed close to the frame, and hence there is a risk of a shadow being cast by the frame on the sheet of material within the field of view.

In the sixth embodiment 600, shown in FIGS. 11 and 11A, which is closely similar to the second embodiment 80, frame 601 is provided with a rear wall 602, similar to wall 89, but extending upwardly in the direction of arrow 11U, away from base 603, such that a top edge 604 of the wall, corresponding to top edge 89T is at a different height to the top edge 605 of the front wall 606, that is the top edge corresponding to top edge 88T. A benefit of having the rear wall higher than the front wall is that it is easier to insert sheets of material into the slot, and encourages them to be inserted facing a desired direction. A tall rear wall provides additional printing area 607 and a rear printing area 608 for promotional material. A tall rear wall enhances the support given to a sheet of material located or held in the vision area 609. The lenses 614 and 615 are directed in the direction of arrow 6D beyond base 603 which is a furthest extent of the frame 601. The base 603 is a bottom facing surface contact point. The lenses 614 and 615 are a pair of reading glasses 615 secured to the frame 601 on the front wall 606 which is a front facing portion of the frame. The lenses are fixedly mounted to the frame 601 at or adjacent to edge 616, 616'. The edge 616, 616' is a bottom facing surface contact point arranged to rest on a surface. When standing on a surface the frame 601 rests on edge 616, 616' and base 603.

The frame 601 is a vision aid for a user having a pair of lenses 613, 614 arranged as a pair of binocular lenses 617, each of the lenses of the pair being directed in the direction of arrow 6D away from the vision area 609.

Hence, each of the lenses 613 and 614 is a magnifying lens and is directed away from the vision area.

In a particular embodiment of the invention similar to that shown in FIGS. 11 and 11A, where the tall rear wall 602 is taller in the direction of arrow 11U than that shown in FIGS. 11 and 11A, it has been found more convenient for a user to have the lenses arranged so that they are directed in the direction of arrow 6U (FIG. 11A), away from the surface in an upward direction. Hence, in this particular embodiment the lenses face away from a center of the frame, and are directed away from, the vision area.

FIG. 8 shows a third embodiment of the invention 90, having a frame 91 arranged to removably hold a sheet of material 93 (shown as being transparent in this figure) in a vision area 94. The frame 91 has binocular lenses 95 and 96 focused away from the vision area 94. The frame 91 of the second embodiment is provided with an open pocket 97, formed by closed base 92 and two opposed upstanding sidewalls 98 and 99 and two end walls 101 and 102. The base 92 is arranged to rest on a surface 9S. The vision area 94 extends upwardly in the direction of arrow 9A from the pocket. Hence a sheet of material such as sheet 93 is in the vision area when it is located in the pocket 97. The pocket 97 is arranged to hold a plurality of sheets of material. Such a plurality of sheets of material could comprise a folded leaflet, or a bound booklet. For example, in a restaurant, the pocket could be used to hold a menu and a wine list. Another example would be on a customer service counter, such as in a pharmacy or drugstore where the sheet material could be advertising material and or advisory leaflets.

The embodiment 90 is used in a similar manner to the first embodiment. A user will remove the sheet or sheets of material from the pocket 97 and hold it in one hand, while picking up and holding the frame 91 in front of their eyes so as to enable the optical binocular lenses to be used to facilitate viewing of the sheet or sheets of material. The embodiment 90 includes a substantially inverted V shaped cross section 90V connected to a substantially U shaped section 90U. The inverted V shaped portion is formed by wall 108 and wall 98, and the substantially U shaped section is formed by wall 98 and closed base 92 and wall 99. In the embodiment 90, the U shaped section is closed by end walls 101 and 102, however the inverted V shaped portion 90V is open at each end. Hence a user may easily grasp the frame 90 by holding the outside surfaces of walls 98 and 99, outside of the magnified field of view.

Although the frame is preferably made of a thermo-plastic plastics material having a degree of resilience so that the frame is better able to withstand knocks and rough treatment in service, it is preferably sufficiently rigid that it is not easily deformed by a user when being held.

To protect the optical surfaces of the lenses 5, 6 and 85, 86 and 95, 96, preferably the optical surfaces lenses are each recessed below the surrounding frame portions 5F and 6F, 85F and 86F, and 95F and 96F respectively. Hence after manufacture, during transport, and later when in use, the lenses will be protected against accidental abrasion.

It should be noted that in FIGS. 9 to 12 inclusive the frame has been shown for convenience having a thin thickness, which for example would be the case if it were to be made of sheet metal with the lenses inserted into the frame. However, if the frame were made of a shaped plastics material, it is likely to have a significant thickness.

FIGS. 9 and 9A show a frame 400 of a fourth embodiment of the invention having lenses 401 and 402 directed in the direction of arrow 9D to a magnified viewing plane below the frame. A rear wall 404 extends from a top radiused corner 403 to a closed base edge 405. Extending upwardly from the base edge 405 is an inner wall 407, having a top edge 406 within the radiused corner 403. A location 408 is formed by walls 404, 407 and closed edge 405 so that a sheet of material (not shown in these figures) may be inserted by moving in a direction of lateral arrow 9L so as to be located in a vision area 9V. Likewise the sheet of material may be removed by sliding it out of the location 408 in the lateral direction of arrow 9L. A cut-out (not shown in this embodiment) may be provided in edge 410 of the inner wall to facilitate removal of the sheet of material. When inserted in the location 408, a vision area 9V may be viewed from a rear of the frame in a direction of arrow 9W.

FIGS. 10 and 10A shown a frame 500 according to a fifth embodiment of the invention, having a frame 501 with a front wall 502 having lenses 503 and 504 substantially co-planar with the front wall, and an intermediate wall 505 substantially parallel with the front wall, but displaced downwards from the top wall by interconnecting vertical wall 506. Vertical wall 506 and front wall 502 meet at top edge 507 and vertical wall 506 and intermediate wall 505 meet at a lower edge 508. The frame 501 rests on surface 10S at a front edge 511 and a rear edge 512, the rear edge being a lower edge of rear wall 510. The rear wall 510 meets and supports the intermediate wall 505 at a second top edge 509. A sheet of material 520 to be supported by the frame 501 is placed on the intermediate wall 505, so that a bottom edge 521 of the sheet of material abuts the vertical wall 506 at or adjacent to the edge 508 where the vertical wall joins the intermediate wall. Hence the sheet of material is located in a substantially upwardly facing vision area 530 which as indicated by the arrows 530 may extend beyond a support face 513 of the intermediate wall 505.

FIG. 12 is an end view of a frame 700 according to a seventh embodiment of the invention, having a front wall 702 with at least a lens 704. The front wall has an upper radiused edge 705 joining the front wall to a substantially vertical wall 707, which extends to a lower radiused edge 708. Lower radiused edge 708 has a large radius so as to permit a rear wall 712 to be resiliently deflected away from the vertical wall 707 so as to open a narrow gap 12G between abutting portions 706 and 709 of the vertical wall and rear wall respectively. Hence a sheet of material 720 (only a short section shown in FIG. 12) may be inserted between the abutting portions and lightly gripped between the abutting portions so as to removably retain the sheet of material in the frame. The rear wall 712 extends to a roll top 711 at its upper edge. Roll top 711 forms a hook shape 711 under the roll top. A benefit of hook shape 711 is that a user may easily hold the frame for use of the lens or lenses 704. A further benefit of the hook shape is that the frame may be arranged to be supported by being hooked onto an upwardly facing horizontal edge instead of being rested on a horizontal surface. As shown in FIG. 12, when inserted between the abutting portions 706 and 709, a sheet of material 12G will tend to lean forwards over the lens of the front wall. It will be apparent that by providing a different dimension for the front wall 702 and or a length of an arc of the radius 705, the position adopted by a sheet of material inserted between the abutting portions may be adjusted to suit a particular application.

It should be noted that in selecting different dimensions for the front wall 702 and the radius 705, an intrusion of the lower edge 708 into a magnified viewing area seen though lens 704 should be preferably minimized. The intrusion may be reduced by reducing a vertical length of the wall 707, or by substantially increasing a radial dimension of the radius 705.

Figure 13:
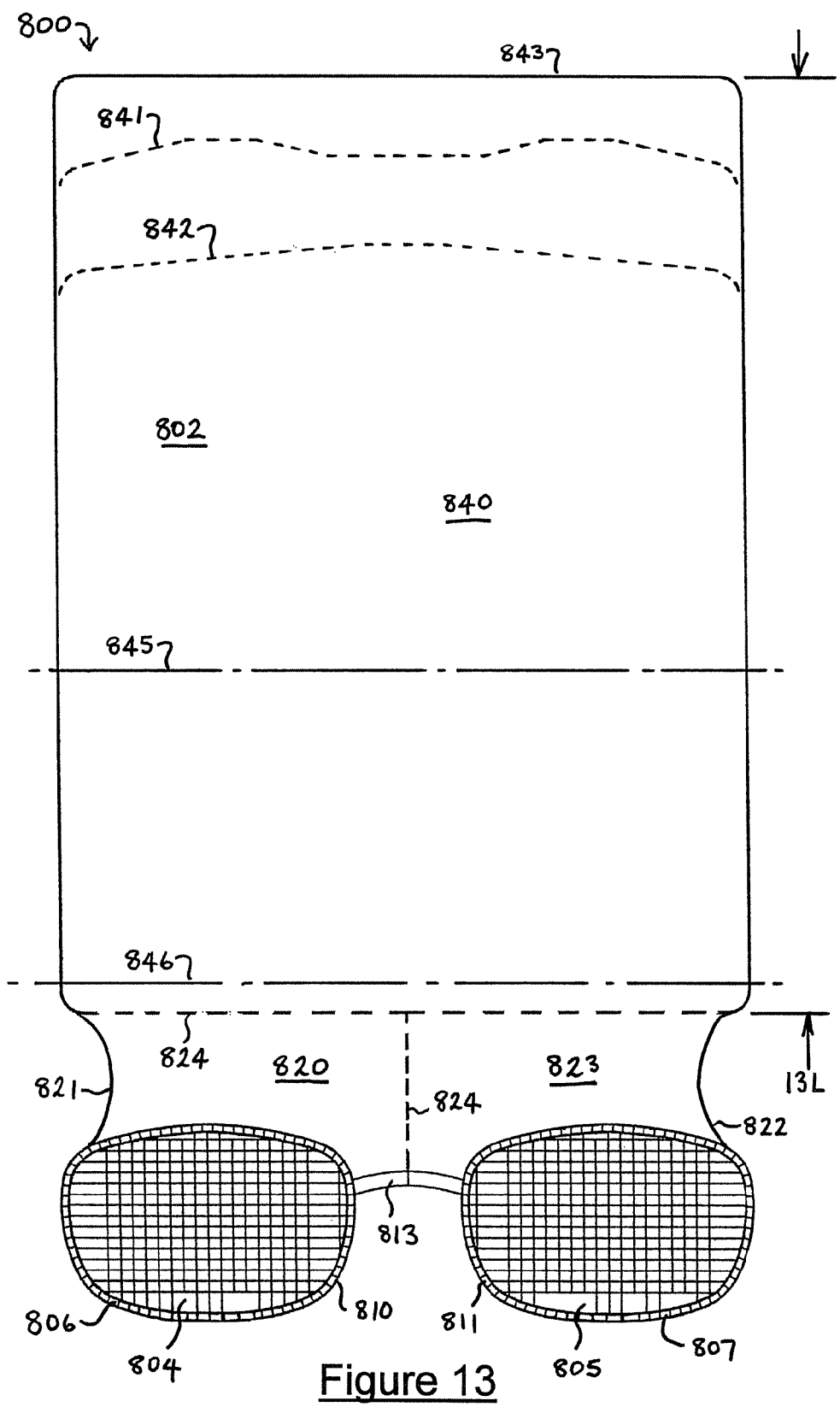
FIG. 13 is a plan view of a molded plastics blank suitable for forming or shaping into an embodiment of the invention as shown in any of the preceding figures.

From FIG. 13, a plan view of a molded plastics blank 800 includes a substantially planar sheet 802 having two molded lenses 804 and 805 within upstanding rims 806 and 807. The upstanding rims visually define the extents of the lenses, and also provide protection against abrasion of the surface of the lenses should they be placed on a flat surface. Between the lenses curved edges 810, 811 and 813 form a bridge 814 to provide a location on a user's nose. The substantially planar sheet 802 has a shaped first portion 820, having shaped sides 821 and 822 and a boundary 824 enclosing a surface 823. In the embodiment shown surface 823 is substantially flat, but in an alternative embodiments may be profiled. For example, the surface 823 may be curved about center line 824 and shaped so as to form conically curved surfaces leading towards the edges 821 and 822.

The substantially planar sheet has a substantially rectangular second portion 840, which if necessary to suit a particular application, may be cropped to shorten a length 13L of the second portion, for example at crop lines 841 or 842. It will be noted that 841 and 842 show by way of example, possible alternative profiles for a cropped end. A further alternative profile would be a rectangular end as the original end 843 of the blank.

To make a frame such as one of the frames shown and described herein with reference to the FIGS. 1 to 12, once cropped if necessary, the blank is formed by folding or bending as required about fold lines 845 and 846. The molded plastics blank is preferably made from a thermoplastic material, and hence folding may be facilitated by the use of a heated tool softening the plastic in the region to be bent. It will be apparent that the use of a molded blank that is subsequently formed to make a frame according to the present invention facilitates the production of a large range of frames, so that a short production run of a particular frame may be easily produced to meet the particular requirements of a specific application.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

The invention claimed is:

1. A frame arranged to removeably locate a sheet of material in a vision area, the frame having at least one lens directed away from the vision area, wherein the frame is formed from a blank and the frame has a cross-sectional shape comprising at least an inverted V shape.

2. A frame as claimed in claim 1, wherein the frame comprises a pair of binocular lenses, each directed away from the vision area.

3. A frame as claimed in claim 2, wherein an inverted U shaped gap is provided between the lenses.

4. A frame as claimed in claim 2, wherein the lenses are directed to a plane beyond a furthest extent of the frame.

5. A frame as claimed in claim 1, wherein the inverted V shape extends to at least an end of the frame.

6. A frame as claimed in claim 1, wherein the frame is arranged to rest on a surface, the sheet of material being located such that the vision area is above the surface and extends away from the surface.

7. A frame as claimed in claim 6, wherein the at least one lens is directed below the surface.

8. A frame as claimed in claim 6, wherein the frame is formed by cropping and or folding and or bending the blank.

9. A frame arranged to removeably locate a sheet of material in a vision area, the frame having at least one lens directed away from the vision area, wherein the frame is formed from a blank and the frame has a cross-sectional shape comprising at least a U shape.

10. A frame arranged to removeably locate a sheet of material in a vision area, the frame having at least one lens directed away from the vision area, wherein the frame is formed from a blank and the frame has a cross-sectional shape comprising at least an M shape.

* * * * *